US012705435B2

(12) United States Patent
Gillham et al.

(10) Patent No.: US 12,705,435 B2
(45) Date of Patent: Aug. 11, 2026

(54) TEXTUAL INPUT ANALYSIS METHODS AND SYSTEMS FOR DETERMINING DEGREE OF CORRECTNESS

(71) Applicant: Originality.ai Inc, Collingwood (CA)

(72) Inventors: Jonathan Gillham, Collingwood (CA); Conor Watt, Collingwood (CA); Liam Mcnally, Collingwood (CA); James Ball, Stratford (CA)

(73) Assignee: ORIGINALITY.AI, Collingwood (CA)

( * ) Notice: Subject to any disclaimer, the term of this patent is extended or adjusted under 35 U.S.C. 154(b) by 146 days.

(21) Appl. No.: 18/600,444

(22) Filed: Mar. 8, 2024

(65) Prior Publication Data

US 2025/0124237 A1 Apr. 17, 2025

Related U.S. Application Data

(60) Provisional application No. 63/544,626, filed on Oct. 17, 2023.

(51) Int. Cl.
*G06F 40/40* (2020.01)
*G06F 16/332* (2025.01)

(52) U.S. Cl.
CPC ............ *G06F 40/40* (2020.01); *G06F 16/332* (2019.01)

(58) Field of Classification Search
None
See application file for complete search history.

(56) References Cited

U.S. PATENT DOCUMENTS

| | | | | |
|---|---|---|---|---|
| 11,461,807 | B2 | 10/2022 | Myslinski | |
| 11,526,675 | B2 | 12/2022 | Ghulati | |
| 12,067,366 | B1 * | 8/2024 | Heller | G06F 40/35 |
| 2022/0164546 | A1 * | 5/2022 | Jiang | G06F 40/40 |
| 2022/0237382 | A1 * | 7/2022 | Abraham | G06F 40/284 |
| 2023/0259705 | A1 | 8/2023 | Tunstall-Pedoe et al. | |

OTHER PUBLICATIONS

R. Casillas et al., "Automatic Fact Checking Using and Interpretable Bert-Based Architecture on COVID-19 Claims", Applied Sciences, Oct. 21, 2022.

G. Karadzhov et al., "Fully Automated Fact Checking Using External Sources", Oct. 1, 2017.

* cited by examiner

*Primary Examiner* — Nicole A K Schmieder
(74) *Attorney, Agent, or Firm* — Ramesh Rajaduray

(57) ABSTRACT

Disclosed is a method and system to assess the veracity of textual input. Upon receiving user-provided content, the system segments the input into fact-oriented textual fragments. Subsequently, search strings are crafted from the fragments and employed to fetch pertinent documents from a designated database. Each extracted document undergoes filtration to distill fact-based content. The initial fragments are then juxtaposed against the distilled content to discern similarities or discrepancies. Culminating the process, the system classifies the content of user into specific veracity categories, ranging from absolute terms like "true" to negations like "false", with additional nuanced classifications like "misleading" or "outdated" further enhancing the precision of the assessment.

20 Claims, 5 Drawing Sheets

You are an expert fact checker and asked to provide your judgement on if the following is (True, Mostly True, Half True, Mostly False, False, Pants on Fire, Unverified, Misleading, Opinion, Outdated).

This is the section of the document to evaluate [The town hosts an annual festival called "Collingwood Colors," where residents and visitors gather to celebrate the vibrant autumn foliage that blankets the region.]

This is the complete document for further context [Collingwood is a charming town located in Ontario, Canada, known for its picturesque natural beauty and stunning views of the nearby Blue Mountains.

The town's economy thrives on tourism, attracting visitors from all over the world, especially during the winter months, when it becomes a popular destination for skiing and snowboarding enthusiasts.

Collingwood is home to the world's largest rubber duck, which serves as a quirky landmark and a fun photo opportunity for tourists and locals alike.

The town hosts an annual festival called "Collingwood Colors," where residents and visitors gather to celebrate the vibrant autumn foliage that blankets the region.

Collingwood's local cuisine is renowned for its unique fusion of Canadian and Caribbean flavors, offering a delightful array of dishes that cater to diverse tastes.]

The provided section of the document reads:

"Collingwood is a charming town located in Ontario, Canada, known for its picturesque natural beauty and stunning views of the nearby Blue Mountains."

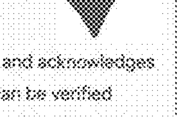

Based on my analysis, I would rate this statement as True.

The statement accurately describes Collingwood as a town located in Ontario, Canada, and acknowledges its reputation for natural beauty and proximity to the Blue Mountains. This information can be verified through various reliable sources, such as government websites, travel guides, and maps. Additionally, the statement does not contain any misleading or false information, nor does it promote harmful or biased beliefs. Therefore, I conclude that the statement is True.

The statement "Collingwood is home to the world's largest rubber duck" is False.

According to multiple sources, including news articles and Wikipedia, the world's largest rubber duck is actually located in Toronto, Canada, not Collingwood. The rubber duck in question is a giant inflatable structure that has been displayed in various locations around Toronto, including the city's harborfront area. It has become a popular tourist attraction and symbol of the city.

Therefore, the statement about Collingwood being home to the world's largest rubber duck is incorrect and receives a rating of False.

FIG. 5

TEXTUAL INPUT ANALYSIS METHODS AND SYSTEMS FOR DETERMINING DEGREE OF CORRECTNESS

CROSS REFERENCE TO RELATED APPLICATION

This application claims the benefit under 35 U.S.C. § 119 (c) of U.S. Provisional Application No. 63/544,626 entitled "TEXTUAL INPUT ANALYSIS METHODS AND SYSTEMS FOR DETERMINING DEGREE OF CORRECTNESS" filed Oct. 17, 2023, which is incorporated herein by reference.

TECHNICAL FIELD

The disclosure pertains to an advanced artificial intelligence (AI) powered solution designed to automate the fact-checking process in content creation and publishing, addressing the challenges posed by inaccuracies in AI-generated content, thereby safeguarding the integrity and reliability of information in the digital publishing sector.

BACKGROUND

In the constantly evolving digital age, there is a significant uptick in content creation and distribution. The ever-expanding horizon of content is a result of human intelligence and creativity, also driven by artificial intelligence (AI) systems. The publishing sector, traditionally defined by human oversight and quality control, finds itself navigating a world where technology, specifically AI, plays a more dominant role than ever before. The increasing dependence on AI technologies, although promising and filled with benefits, brings forth a myriad of unique challenges.

One essential aspect of publishing is ensuring the integrity of content. Historically, editors have shouldered the responsibility of sifting through vast amounts of information to ascertain the veracity. Fact-checking indicates a process that verifies the accuracy and truthfulness of content before reaching the audience. Given the inundation of AI-generated material in recent times, the task of fact-checking has taken on an added layer of complexity and importance.

An emergent issue associated with AI-driven content is the introduction of 'hallucinations'. The hallucinations occur when AI algorithms, in the pursuit of generating coherent and contextually apt content, inadvertently introduce inaccuracies or misleading snippets. The repercussions of such hallucinations are manifold: publishers risk damaging the reputation, seeing a decline in reader trust, and could even face legal and ethical dilemmas.

To appreciate the enormity of the challenge, consider the current content boom. The digital world witnesses the publication of millions of articles, reports, blogs, and other content forms daily. Such content deluge, while offering readers a treasure trove of choices, also raises the probability of encountering incorrect or misleading data. Compounding the aforesaid challenges is the fact that many current fact-checking tools, though technologically advanced, are resource-intensive. The operational demands might be beyond the capacity of many publishers, especially those with resource constraints or those operating on lean budgets.

On one hand, AI-generated content has brought the aforementioned challenges to the forefront. On the other hand, AI holds immense promise in devising innovative solutions tailored to the aforesaid issues. There are emerging applications today aiming to utilize the capabilities of Large Language Models (LLM) for content verification. By leveraging the power of LLM, the tools indicate a future where AI-driven solutions can maintain and even enhance the authenticity and reliability of AI-produced content.

Such platforms and tools could redefine the landscape of digital publishing. With a vision to integrate seamlessly into the workflow of editors, the systems offer the possibility of streamlining the fact-checking process. Imagine an AI-driven mechanism that can efficiently scan vast amounts of content, flagging inaccuracies or points of concern. Such a tool can significantly elevate the quality of online material, ensuring that readers are presented with trustworthy information.

Furthermore, the AI-based solutions are designed to keep up with the rapid pace of today's digital content generation. By doing so, they ensure that the process of verification and validation does not become an impediment in the content publishing cycle.

As people stand amidst a transformative phase in the world of content, the fusion of AI-driven content creation and validation tools will be instrumental. The validation tools symbolize the harmonious coexistence of technology with the age-old publishing values of accuracy, reliability, and trustworthiness. The future beckons with challenges and opportunities, and with the right technological allies, the publishing industry can confidently march ahead.

SUMMARY

The aim of the present disclosure is to provide a method and system for analyzing textual input to automate the fact-checking process. The aim of the disclosure is achieved by a method and system for analyzing textual input for addressing the challenges posed by inaccuracies in AI-generated content, thereby safeguarding the integrity and reliability of information in the digital publishing sector.

In an embodiment, the proposed method discloses analyzing a textual input to determine a degree of correctness, comprising: receiving said textual input from a user; analyzing said received textual input to generate one or more fact-related textual fragments; generating one or more search strings based on said generated fact-related textual fragments; using said one or more search strings to retrieve more than one relevant document from a search database; segregating relevant fact-related textual corpus from each of the retrieved relevant documents; comparing said one or more fact-related textual fragments with corresponding generated fact-related textual corpus; and categorizing the received textual input into at least one category selected from a group consisting of: true, mostly true, half true, mostly false, false, pants on fire, unverified, misleading, opinion, and outdated.

In an embodiment, rendering is performed of an annotated categorized input text.

In an embodiment, refining of the generated one or more search strings is performed, based on additional contextual information associated with the received text.

In an embodiment, a feedback is received on the categorization result from the user.

In an embodiment, a learning module is configured to improve the categorization accuracy over time based on user feedback.

In an embodiment, a source credibility score is identified based on a predetermined set of criteria.

In an embodiment, confidence score is generated to indicate the level of certainty associated with the categorization of the received text.

In an embodiment, the categorization result is displayed alongside corresponding snippets from the segregated relevant fact-related textual corpus.

In an embodiment, the proposed system analyzes a textual input to determine a degree of correctness, comprising: a user interface for receiving the textual input from a user; and a backend system configured to: analyze the received textual input to generate one or more fact-related textual fragments; generate one or more search strings based on said generated fact-related textual fragments; use said one or more search strings to retrieve more than one relevant document from a search database; segregate relevant fact-related textual corpus from each of the retrieved relevant documents; compare said one or more fact-related textual fragments with corresponding generated fact-related textual corpus; and categorize the received textual input into at least one category selected from a group consisting of: true, mostly true, half true, mostly false, false, pants on fire, unverified, misleading, opinion, and outdated.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein.

Embodiments of the present disclosure will now be described, by way of example only, with reference to the following diagrams.

FIG. 5 illustrates the mechanism for prompt creation and the subsequent results tailored for each distinct section, in accordance with an embodiment of the present disclosure.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
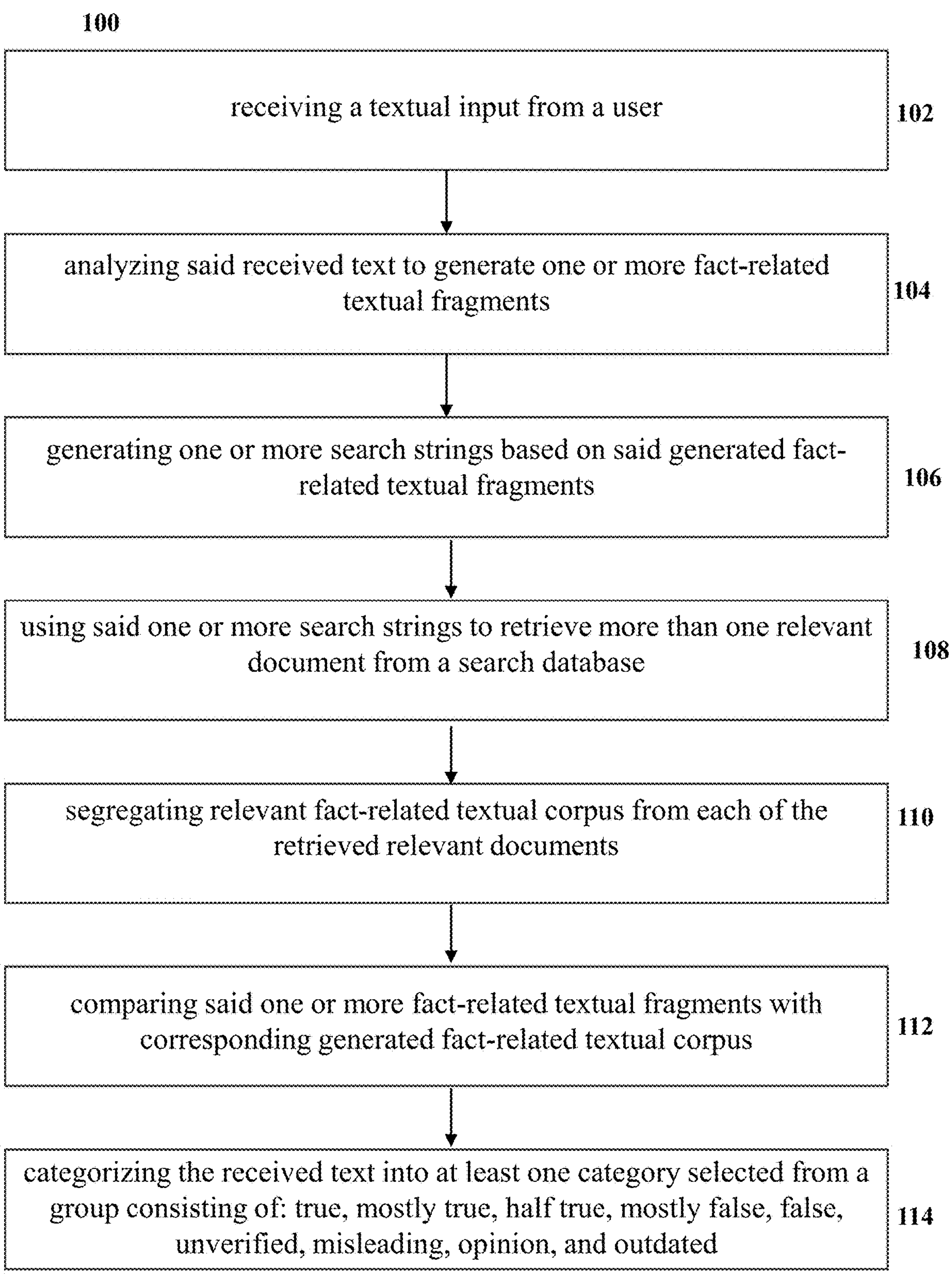
FIG. 1 illustrates a method for analyzing textual input to determine a degree of correctness, in accordance with an embodiment of the present disclosure.

FIG. 1 illustrates a method 100 for analyzing textual input to determine a degree of correctness, in accordance with an embodiment of the present disclosure. At step 102, the process begins by receiving a textual input provided by a user. The textual input could be any form of written or typed content, such as a statement, article, or passage. At step 104, the received textual input is analyzed. The analysis comprises identification and extraction of one or more fragments of textual input that pertain to factual information. The fragments represent the pieces of information within the text. At step 104, the received textual input decomposes into meaningful fragments, identifying factual statements that can be further verified. For fragmentation, the textual input is converted into sentences or smaller chunks using tokenization techniques. Further, any Natural Language Processing (NLP) algorithm, such as Named Entity Recognition (NER) algorithm, etc. can be used to identify sentences or fragments that contain factual claims or statements. Optionally, Dependency parsing might help in understanding the sentence structure and extracting factual information. At step 106, based on the fact-related textual fragments identified in the previous step, one or more search strings are generated. The search strings are constructed to facilitate effective retrieval of relevant documents from a designated search database. For search string formulation, Term Frequency-Inverse Document Frequency (TF-IDF) might be used to determine critical words, which can be used to formulate search string. In an embodiment, synonyms and related terms can be added to the search strings to broaden or refine the search. To formulate search strings Boolean operators (e.g., "AND", "OR", "NOT", "NEAR"), field annotation (e.g., "title", "abstract", "author", "Publication date"), literature type (e.g., "news article", "Governmental gazette" etc.) and combination thereof can be used to concatenate keywords to improvise search.

At step 108, the generated search strings are used to query the search database. A search engine or a database management system with a query interface can be employed to execute the search. Such action results in the retrieval of more than one document that is relevant to the factual information contained in the original textual input. At step 110, from each of the retrieved relevant documents, the system isolates and extracts the portions of textual input that are directly related to the factual information. To isolate and extract the portions, regular expressions or string-matching techniques, context analysis, sentiment analysis, or keyword matching can be used. The documents, retrieved from previous steps to isolate and extract textual input portions that hold relevance to the factual, are scanned using predefined set of keywords or contextual clues. The scanning enables filter out irrelevant information, spotlighting the segments of textual input that merit further analysis. Post scanning, the algorithm employs Natural Language Processing (NLP) techniques to identify sections that specifically relate to the factual claims in question.

Step 112 involves a comparison between the originally identified fact-related textual fragments and the corresponding textual corpus that was extracted from the retrieved documents. The comparison is crucial for verifying accuracy of the original fragments. For comparison, various techniques like similarity metrics (e.g., cosine similarity or Jaccard index), keyword matching, or semantic analysis can be used to discern the level of agreement between the two sets of text. At step 114, based on the outcomes of the comparison, the received textual input is categorized into one or more predefined categories. Such categories include labels such as true, mostly true, half true, mostly false, false, pants on fire, unverified, misleading, opinion, and outdated. Each category represents a different level of accuracy or truthfulness.

In an embodiment, the method 100 may enable the rendering of an annotated, categorized input text, a functionality instrumental for users and editors in identifying and understanding the categorized segments of content through distinct visual indicators like highlights or markers, providing instantaneous insight into the areas of content that have undergone detailed analysis and categorization. Such crucial visualization element streamlines user interaction by directing attention to the sections of textual input that have been analyzed and categorized, thereby offering insights into the context and rationale behind each categorization and proves indispensable for editors who are often tasked with navigating through extensive amounts of content, ensuring swift and precise identification of critical areas. For example, every sentence or fragment that contains a factual claim is highlighted or color-coded based on the category of correctness: green for 'True', red for 'False', yellow for 'Unverified', and so on. Optionally, textual input might be associated with interactive markers. For instance, hovering over a highlighted fragment could display a pop-up with more details about the verification process, such as the source documents that were used for verification, or a more detailed explanation of the categorization. In another embodiment, a summary box can be shown to provide overview of overall categorization statistics, e.g., 5 True claims, 2 False claims, 3 Unverified claims, etc. In another aspect, the present disclosure provides filtering options to show/hide the categorized segments, or only focus on the categories they are interested in, e.g., showing only the 'False' claims.

The following table encapsulates a range of textual categories, each with a distinct definition and example to provide a clearer understanding of how textual input or statements might be categorized based on their accuracy, verification status, or nature (opinionated, misleading, etc.).

| CATEGORY | DEFINITION | EXAMPLE |
| --- | --- | --- |
| TRUE | Statements that are accurate and supported by evidence. | "The Earth orbits the Sun." |
| Mostly True | Statements that are mostly accurate but may lack context or have minor inaccuracies. | "Eating carrots improves night vision." (While carrots are good for eye health, they don't significantly improve night vision.) |
| Half True | Statements that have an element of truth but are either outdated, lack context, or are overly simplified. | "You only use 10% of your brain." (This is a simplification; the entire brain has a function.) |
| Mostly False | Statements that contain a minor element of truth but are largely inaccurate. | "Vaccines cause autism." (There is a consensus in the medical community that vaccines do not cause autism.) |
| FALSE | Statements that are inaccurate or not supported by evidence. | "Humans can breathe in space without assistance." |
| Pants on Fire | Outrageously false or ridiculous statements. | "The moon is made of green cheese." |
| Unverified | Statements that have not been substantiated or confirmed by evidence. | "Aliens built the pyramids." (This claim lacks scientific evidence.) |
| Misleading | Statements designed to deceive or give a wrong impression, often mixing truth with falsehoods. | "Sugar is a great source of energy so it's good to consume it in large quantities." (Misleading as excessive sugar is harmful to health.) |
| Opinion | Statements that represent personal beliefs or preferences, not objective facts. | "Chocolate is the best dessert." |
| Outdated | Statements that might have been true in the past but are no longer accurate due to changes over time. | "Pluto is the ninth planet in our solar system." (This was the case until 2006 when Pluto was reclassified as a dwarf planet.) |

In a further embodiment, the method 100 may comprise an advanced feature where the initially generated search strings are refined by incorporating additional contextual information associated with the received text, enhancing the relevance and accuracy of the searches. Such refinement is integral for capturing the subtleties often embedded within the context of text, ensuring that fact-checking function of the system are efficient, avoiding the omission of critical details that may be embedded within extensive and complex texts. For example, the phrase "black apple good for mouth health" can indeed cause ambiguity as the word "apple" could refer to either the fruit or the tech company. The initial search string generated might be "black apple mouth health", which could retrieve a mixture of results, some related to oral health benefits of black apples, while others might incorrectly lead to technology-related topics (e.g., discussions about a black-colored Apple smartphone or product). The contextual information about health in this case is vital to direct the search towards the relevant domain using refined string "black apple fruit oral health". The resultant search documents can be used to verify the claim made in the original text.

In another embodiment, the method 100 may enable user interaction by incorporating a feature that allows users to provide feedback on the categorization results, fostering an environment where user insights and expertise are valued and leveraged to enhance the efficiency and adaptability of the system. The interactive approach enables incorporation of user insights to optimize categorization processes, enabling the enhancement of system performance and fostering a symbiotic relationship between human intuition and automated analysis. For example, news articles are categorized into different buckets such as 'Politics', 'Technology', 'Health', etc. However, a user notices that an article about Health policy is incorrectly categorized under 'Politics'. In such case, present disclosure allows the user to provide feedback, suggesting that the article should be categorized under 'Health' instead of 'Politics'. This feedback mechanism further can include user interface where users can suggest the correct category and even provide a brief rationale for their suggestion.

In a distinct embodiment, a learning module may be integrated, which may be designed to assimilate user feedback to continually optimize and enhance categorization accuracy. Such mechanism transforms user feedback into a valuable learning instance, allowing the algorithms of system to adapt and refine the processes progressively, ensuring the continual alignment of categorizations with user expectations and the dynamic nature of digital content. Continuation of previous example, learning module can absorb and learn from user feedback to refine/improve the categorization accuracy. For instance, the feedback regarding miscategorizations is fed into this module to train algorithms to better understand the boundaries between 'Politics' and 'Health' in the context of news categorization. The adaptive learning mechanism significantly boosts performance, and the improved accuracy in categorization improves trust and engagement from the user community.

In another embodiment, method 100 may conduct an evaluation to assign a credibility score to the source based on a predetermined set of defined criteria, offering users a quantifiable representation of the reliability and accuracy of the textual input. Such features are essential in the current information era, fraught with misinformation, by providing users a robust and reliable metric to assess the trustworthiness and authenticity of the textual input.

In a subsequent embodiment, method 100 may prioritize transparency by generating a confidence score, representing a quantifiable indication of the certainty in the categorization decisions. The method 100 provides users with deeper insights into the decision-making of system, especially in situations involving ambiguous or multi-interpretational textual input, enabling users to make informed conclusions based on a clear understanding of the categorization processes.

In one embodiment of the present invention, method 100 may be characterized by a user interface prioritizing the user experience. The user interface exhibits categorization outcomes concurrently with pertinent factual excerpts sourced from distinct text corpuses. Such a configuration facilitates users in directly associating the results of the categorization with the foundational reference materials instrumental in shaping said results. The juxtaposition not only augments user comprehension but also fosters trust, as users can readily discern the underlying rationale for each categorization action. By offering transparent insights into the categorization basis, method 100 optimizes the evaluation process and bolsters the confidence of user in the proficiency and reliability of the system.

For an instance, editor had received political article from column writer. Editor can submit political article containing phrase "Senator Smith voted against the healthcare bill in 2021". The backend system identifies and extracts the fragment "Senator Smith voted against the healthcare bill in 2021" as factual information. Based on the identified fragment, the search strings such as "Senator Smith healthcare bill vote 2021", "Senator Smith voting record 2021", etc., can be formulated to facilitate effective retrieval of relevant documents. The formulated search strings can be used to query a designated search database (such as a database of congressional voting records, database of upper and lower house, Senate reports etc.) to retrieve relevant one or more documents. From the retrieved documents, text segments related to Senator Smith's vote on the healthcare bill in 2021 can be extended. For instance, a textual corpus stating, "Senator Smith voted in favor of the healthcare bill on August 2021" can be extracted from senate report published in 2021. The system compares the original fragment from the article with the textual corpus extracted from the retrieved documents. In present case, it identifies a discrepancy: the article claims 'against' vote, while the extracted text indicates an 'in favor' vote. Based on the discrepancy identified, the system categorizes the original textual input as "False".

Figure 2:
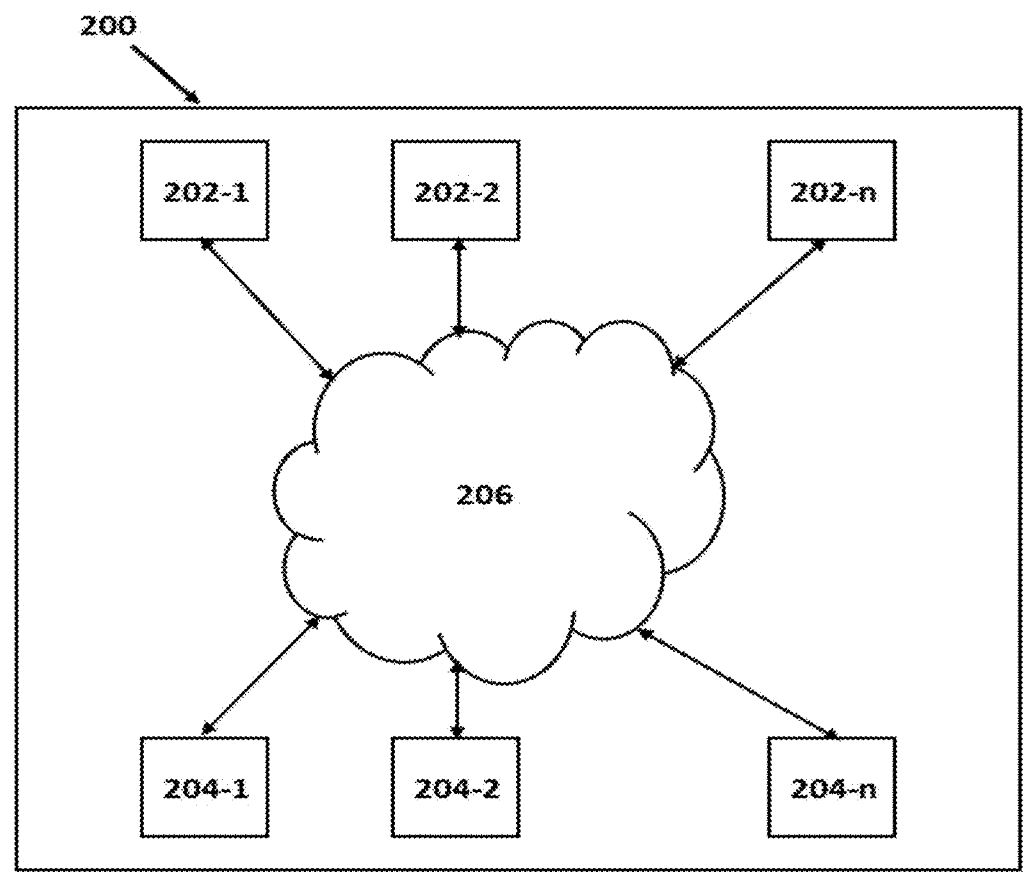
FIG. 2 illustrates a system to analyze textual input and determine the degree of correctness, in accordance with an embodiment of the present disclosure.

FIG. 2 illustrates a system 200 to analyze textual input and determine the degree of correctness, in accordance with an embodiment of the present disclosure. The system 200 enables users to gain quick insights about the authenticity of information they come across, which is particularly relevant. Consider an exemplary scenario where a journalist is researching a contentious issue and stumbles upon a statement that might seem dubious. With a plethora of sources online, verifying each statement can be time-consuming and challenging.

In one embodiment of the present invention, system 200 comprises computing device 202 to display user interface that receives textual content. Throughout the present disclosure depicted computing devices 202-1, 202-2 . . . **202-*n* are collectively referred as computing device 202. Computing device 202 comprises interactive elements, aiming to optimize the interaction of user and streamline the input process. Users, through the implemented functionalities, can effortlessly either transcribe or transfer their desired textual content (be it through a copy-paste mechanism or direct manual typing or uploading entire file/document) into system 200. The emphasis on interaction and user-centric design ensures an unbroken, intuitive, and efficient user experience during the validation procedure. Imagine a journalist using computing device 202** to paste a controversial statement they found in an online article.

In another embodiment, upon receiving the textual input, a backend system 204 or a server arrangement 204 analyses the provided textual input. Throughout the present disclosure depicted backend systems 204-1, 204-2 . . . **204-*n* are collectively referred as backend system 204. A specialized algorithm breaks down the received textual input into fragments, which are then used as the foundational basis for the subsequent steps. for example, statement like "The Eiffel Tower is taller than Mount Everest." System 200** would identify "Eiffel Tower" and "Mount Everest" as the critical fact-related fragments.

In an exemplary embodiment, the computing device 202 and the backend system 204 can be operatively coupled with each other through a cloud computing platform 206.

In a further embodiment, the backend system 204 employs another layer of intelligence to convert the fact-related fragments into optimized search strings. The generation of the aforesaid search strings is a keyword extraction and involves an advanced mechanism that factors in the context around the fragment, ensuring that the search strings are relevant. Using the previous example, rather than searching just "Eiffel Tower", the backend system 204 might search for "Eiffel Tower height."

In another embodiment, system 200 then proceeds to discover the search strings on a vast search database, which could be an integrated web search engine, or a specialized database curated for fact-checking. The database returns multiple relevant documents for each search string. In the context of the current use case, system 200 might retrieve articles, research papers, or encyclopedic entries discussing the heights of the Eiffel Tower and Mount Everest.

In a distinct embodiment, all content from the retrieved documents is not of equal relevance. Hence, the system 200 employs algorithms to segregate the most pertinent fact-related textual corpus from each document, essentially distilling the vast amount of information into concise, relevant snippets that relate directly to the initial fact fragments. For instance, the system 200 would pinpoint and extract sentences that discuss the exact heights of the mentioned landmarks.

In another embodiment, a comparative analysis occurs between the initial fact-related textual fragments and the segregated fact-related textual corpus. The backend system 204 runs a deep comparison, examining context, rather than just looking for direct matches. In the scenario of journalist, the system 200 would compare the claim about the relative heights of Eiffel Tower and Mount Everest with the extracted factual data.

In a subsequent embodiment, based on the outcome of the comparative analysis, the system 200 categorizes the original textual input into predefined categories reflecting the degree of correctness. Categories such as "true," "mostly true," and "misleading" offer users a clear and concise understanding of the validity of text. Returning to the input of journalist, the system 200 would categorize the statement as "false."

In an exemplary aspect, a history teacher, while preparing notes, comes across a statement in a digital textbook that says, "Christopher Columbus discovered America in 1493." Wanting to verify this, the teacher inputs the statement into the system. The backend system breaks down the textual input into the fragments "Christopher Columbus" and "discovered America in 1493." Search strings are generated, and documents are retrieved. The system finds multiple references stating Columbus reached the Americas in 1492. After the comparative analysis, the system categorizes the statement as “mostly false”, which enables the teacher to present accurate information to the students.

Figure 3:
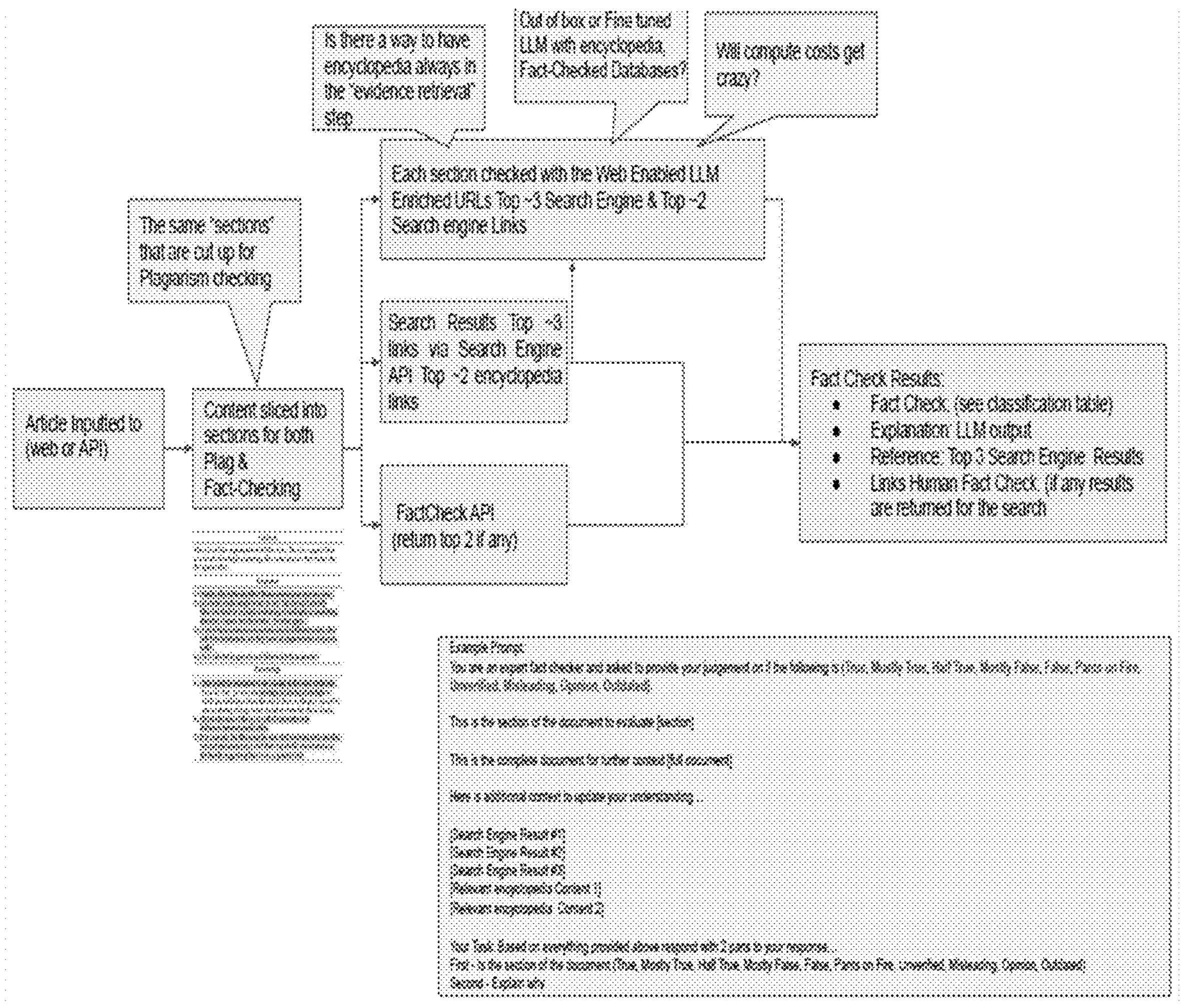
FIG. 3 presents a detailed process flow diagram illustrating a two-pronged approach to plagiarism and fact-checking, in accordance with an embodiment of the present disclosure.

FIG. 3 presents a detailed process flow diagram illustrating a two-pronged approach to plagiarism and fact-checking, in accordance with an embodiment of the present disclosure. The users inputs an article into the system 200 either via a web platform or an API, facilitated by the interface user interface of computing device 202. Once introduced, the backend system 204 takes over, adeptly segmenting the article into distinct sections earmarked for plagiarism detection and fact verification. The demarcated sections undergo examination, leveraging the capabilities of web-integrated large language models (LLM), coupled with the enriched URLs and expansive search engine databases. As a direct consequence of the examination, the backend system 104 furnishes a set of generated outputs, encompassing search results, pertinent search links, and a dedicated fact-check API. Synthesizing information from the outputs, the system 200 formulates the final fact-check results. The aforesaid results, crystallizing the veracity and originality of the provided article, are then seamlessly relayed back to the user, displayed prominently on the user interface of computing device 202, thus completing the verification cycle.

Figure 4:
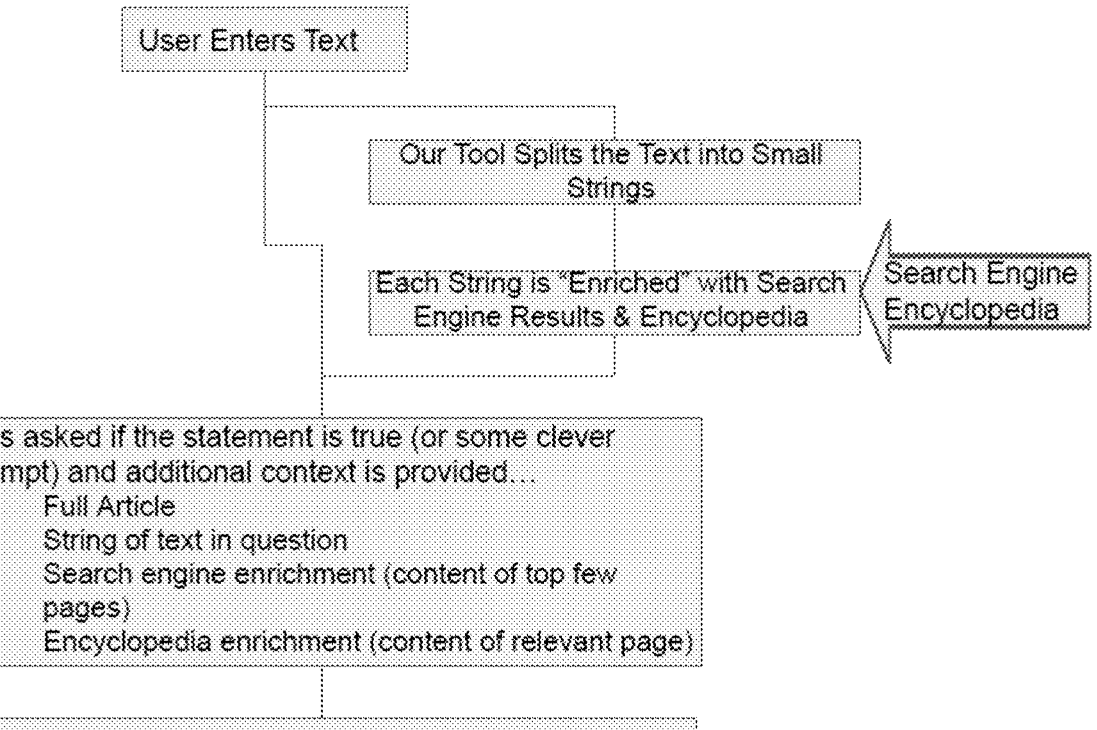
FIG. 4 illustrates the working of a fact-checking procedure, in accordance with an embodiment of the present disclosure.

In FIG. 4, the working of a fact-checking procedure, in accordance with an embodiment of the present disclosure. As illustrated, a user initiates the process by introducing a piece of textual input via user interface of computing device 202. Once submitted, the backend system 204 segments the textual input into strings, which undergo an enrichment process, being cross-referenced with search engine outputs and pertinent encyclopedia pages to imbue them with added contextual depth. To ascertain the conformity of a statement, system 200 engages in an interactive query, posing questions about the truthfulness of the statement, possibly through an intelligent prompt. Such evaluative phase is bolstered by providing context: the complete article, the specific text string under scrutiny, information from the top pages of search engine results (search engine enrichment), and relevant details from encyclopedia pages (encyclopedia enrichment). Taking cues from the amassed data, the backend system 204 embarks on a categorization exercise, attributing specific color codes to each section. The colors act as indicators, signaling the probability of factualness of a statement. If a user interacts with a colored section, an informative popup emerges, presenting the judgment of system on the factuality of the statement. Such popup also directs users to germane search engine and encyclopedia links, serving as evidence for the rendered judgment, thus aiding in an understanding of the evaluated statement.

FIG. 5 illustrates the mechanism for prompt creation and the subsequent results tailored for each distinct section, in accordance with an embodiment of the present disclosure. As depicted, the system 200 assigns distinct color codes to individual sections, transforming the user interface into a visually-guided analytical platform. The color distinctions assist in demarcating the segments and also play vital role in hinting at the nature of the content within, thus guiding users. Furthermore, linked to each color-coded section is a detailed result that the system 200 returns upon examination. The result comes equipped with an explanation that dives deep into the rationale behind the categorization, offering clarity and insights into the decision-making process of the system. By merging the visually differentiated sections with exhaustive explanations, the interface ensures that users don’t just receive a verdict but understand the logic that underpins each judgment, thus fostering transparency and user confidence in the evaluations of system.

Throughout the present disclosure, the term ‘Artificial intelligence (AI)’ as used herein relates to any mechanism or computationally intelligent system that combines knowledge, techniques, and methodologies for controlling a bot or other element within a computing environment. Furthermore, the artificial intelligence (AI) is configured to apply knowledge and that can adapt it-self and learn to do better in changing environments. Additionally, employing any computationally intelligent technique, the artificial intelligence (AI) is operable to adapt to unknown or changing environment for better performance. The artificial intelligence (AI) includes fuzzy logic engines, decision-making engines, preset targeting accuracy levels, and/or programmatically intelligent software.

Artificial intelligence (AI) in the context of the present disclosure relates to software-based algorithms that are executable upon computing hardware and are operable to adapt and adjust their operating parameters in an adaptive manner depending upon information that is presented to the software-based algorithms when executed upon the computing hardware. Optionally, the artificial intelligence (AI) include neural networks such as recurrent neural networks, recursive neural networks, feed-forward neural networks, convolutional neural networks, deep belief networks, and convolutional deep belief networks; self-organizing maps; deep Boltzmann machines; and stacked de-noising autoencoders. An “artificial neural network” or simply a “neural network” as used herein can include a highly interconnected network of processing elements, each optionally associated with a local memory. In an example, the neural network may be Kohonen map, multi-layer perceptron and so forth. The processing elements can be referred to herein as “artificial neural units,” “artificial neurons,” “neural units,” “neurons,” “nodes,” and the like, while connections between the processing elements. A neuron can receive data from an input or one or more other neurons, process the data, and send processed data to an output or yet one or more other neurons. The neural network or one or more neurons thereof can be generated in either hardware, software, or a combination of hardware and software, and the neural network can be subsequently trained.

Optionally, artificial intelligence (AI) employs any one or combination of the following computational techniques: constraint program, fuzzy logic, classification, conventional artificial intelligence, symbolic manipulation, fuzzy set theory, evolutionary computation, cybernetics, data mining, approximate reasoning, derivative-free optimization, decision trees, or soft computing.

What is claimed is:

1. A method for adaptively processing a textual input to determine factual correctness, comprising:

receiving, by a backend system via an interface operating on a computing device, the textual input;

analyzing, by the backend system, the received textual input to generate one or more fact-related textual fragments;

generating, by the backend system, one or more search strings based on the generated one or more fact-related textual fragments, wherein the generation of the one or more search strings comprises concatenating keywords using at least one of:

Boolean operators, field annotations, and literature type indicators;

querying, by the backend system, at least one search database with the one or more search strings to retrieve a plurality of documents comprising textual content relevant to factual claims or statements in the textual input;

segregating, by the backend system, relevant fact-related textual corpus from each of the retrieved plurality of documents;

comparing, by the backend system, the one or more fact-related textual fragments with one or more corresponding fact-related textual corpus;

categorizing, by the backend system using at least one artificial intelligence algorithm, the received textual input into at least one degree-of-correctness category based on the comparing;

adapting, by the backend system, the at least one artificial intelligence algorithm based on information related to results of the categorizing, wherein the adapting enhances an accuracy of the at least one artificial intelligence algorithm; and utilizing the adapted at least one artificial intelligence algorithm to perform the categorizing of one or more subsequent textual inputs.

2. The method of claim 1, further wherein:

the categorizing comprises categorizing at least one fact-related textual fragment into one degree-of-correctness category; and the method further comprises:

generating a visualization data structure that associates the at least one fact-related textual fragment with:

its degree-of-correctness category, a color corresponding to the degree-of-correctness category associated with the at least one fact-related textual fragment, and links to one or more retrieved documents; and transmitting the visualization data structure to the computing device for rendering as an interactive factual correctness visualization.

3. The method of claim 2, further comprising causing, based on user interaction with the factual correctness visualization, the computing device to generate and display a pop-up comprising an explanation of the categorizing of the at least one fact-related textual fragment.

4. The method of claim 1, further comprising receiving user feedback on the categorizing.

5. The method of claim 4, further wherein the adapting of the at least one artificial intelligence algorithm comprises:

adjusting, based on the received user feedback, one or more parameters related to the at least one artificial intelligence algorithm.

6. The method of claim 5, further comprising: utilizing Term Frequency-Inverse Document Frequency (TF-IDF) to determine critical words; and the generation of the one or more search strings performed using the determined critical words.

7. The method of claim 5, wherein:

the one or more Boolean operators are selected from a group comprising AND, OR, NOT, and NEAR; and the one or more field annotations are selected from a group comprising:

title, abstract, author, and publication date.

8. The method of claim 5, further comprising:

refining the one or more search strings by cross-referencing the one or more strings with at least one of:

one or more encyclopedia pages, and one or more search engine outputs.

9. A system for factual verification with adaptive artificial intelligence parameter adjustment, comprising:

an interface operating on a computing device communicatively coupled to a backend system, wherein:

the backend system comprises one or more processors communicatively coupled to at least one memory storing one or more instructions, the backend system is communicatively coupled to at least one search database, the interface obtains a textual input, and the backend system receives the textual input from the computing device; and the one or more processors execute the one or more instructions to:

analyze the textual input received by the backend system to generate one or more fact-related textual fragments, wherein the analyzing further comprises:

tokenizing the textual input to produce one or more tokens based on one or more sentences or smaller chunks, and identifying, using the one or more tokens and a Named Entity Recognition (NER) algorithm, one or more sentences or fragments that contain factual claims or statements, generate one or more search strings based on the one or more fact-related textual fragments, query the at least one search database with the one or more search strings to retrieve a plurality of documents comprising textual content relevant to factual claims or statements in the textual input;

segregate a relevant fact-related textual corpus from each of the plurality of retrieved documents, compare the one or more fact-related textual fragments with the corresponding segregated relevant fact-related textual corpus, categorize, using at least one artificial intelligence algorithm, the textual input into at least one category, receive user feedback related to the categorization via the interface, adjust, based on the user feedback, one or more parameters related to the at least one artificial intelligence algorithm to enhance an accuracy of the categorization, and utilize the at least one artificial intelligence algorithm with the adjusted one or more parameters to categorize one or more subsequent textual inputs.

10. The system of claim 9, wherein the one or more processors execute the one or more instructions to:

refine the one or more search strings by cross-referencing the one or more search strings with one or more encyclopedia pages and one or more search engine outputs.

11. The system of claim 10, wherein the segregating of the relevant fact-related textual corpus comprises using at least one of:

predefined keywords, contextual clues, regular expression matching, string-matching techniques, sentiment analysis, and natural language processing.

12. The system of claim 10, wherein:

the comparison of the fact-related textual fragments with the segregated relevant fact-related textual corpus is based on at least one similarity metric, further wherein:

the at least one similarity metric is based on at least one of:
a cosine similarity and
a Jaccard index.

13. The system of claim 10, wherein:
the comparison of the fact-related textual fragments with the segregated relevant fact-related textual corpus is based on at least one of:
keyword matching, and
semantic analysis.

14. The system of claim 9, wherein:
the one or more fact-related textual fragments comprises a first fact-related textual fragment; and
the one or more processors execute the one or more instructions to:
generate a prompt corresponding to the first fact-related textual fragment, wherein:
the prompt is structured to elicit a factual verification response.

15. The system of claim 14, wherein:
the generation of the prompt is performed using context related to the first fact-related textual fragment, wherein the context is based on at least one of:
the first fact-related textual fragment,
the received textual input,
one or more pages of search engine results, and
one or more encyclopedia pages.

16. The system of claim 15, wherein the generation of the one or more search strings comprises concatenating keywords using at least one of:
Boolean operators,
field annotations, and
literature type indicators.

17. The system of claim 16, wherein:
the Boolean operators are selected from a group comprising AND, OR, NOT, and NEAR; and
the field annotations are selected from a group comprising:
title,
abstract,
author, and
publication date.

18. The system of claim 15, wherein:
the one or more processors execute the one or more instructions to determine critical words utilizing Term Frequency-Inverse Document Frequency (TF-IDF); and
the generation of the one or more search strings is performed using the determined critical words.

19. The system of claim 9, wherein:
the one or more fact-related textual fragments comprises a first fact-related textual fragment;
the categorization comprises categorization of the first fact-related textual fragment into one degree-of-correctness category;
the one or more processors execute the one or more instructions to:
generate a visualization data structure that associates the first fact-related textual fragment with:
its degree-of-correctness category,
a color corresponding to the degree-of-correctness category associated with the first fact-related textual fragment, and
links to one or more retrieved documents.

20. The system of claim 19, wherein:
the one or more processors execute the one or more instructions to transmit the visualization data structure to the computing device;
the transmitting of the visualization data structure causes the interface to display:
the first fact-related textual fragment rendered using the color corresponding to the degree-of-correctness category,
an explanatory message for the degree-of-correctness category, and
the links to the one or more retrieved documents.

* * * * *